Nov. 28, 1967    W. R. SHAFFER ETAL    3,355,112
BEAD DISPENSER FOR USE WITH APPARATUS FOR
MARKING ROAD SURFACES
Filed Dec. 4, 1964    3 Sheets-Sheet 1

INVENTORS
WILLIAM R. SHAFFER
FRANK E. MILLER

BY  Karl W. Flocks

ATTORNEY

INVENTORS
WILLIAM R. SHAFFER
FRANK E. MILLER

BY Karl W. Flocks

ATTORNEY

Nov. 28, 1967  W. R. SHAFFER ETAL  3,355,112
BEAD DISPENSER FOR USE WITH APPARATUS FOR
MARKING ROAD SURFACES
Filed Dec. 4, 1964  3 Sheets-Sheet 3

INVENTORS
WILLIAM R. SHAFFER
FRANK E. MILLER

BY Karl W. Flocks

ATTORNEY

United States Patent Office 3,355,112
Patented Nov. 28, 1967

3,355,112
BEAD DISPENSER FOR USE WITH APPARATUS FOR MARKING ROAD SURFACES
William R. Shaffer and Frank E. Miller, Huntingdon, Pa., assignors to Wald Industries, Inc., Huntingdon, Pa., a corporation of Pennsylvania
Filed Dec. 4, 1964, Ser. No. 416,089
7 Claims. (Cl. 239—380)

The present invention relates to apparatus for marking road surfaces and has particular reference to an improved dispenser for distributing glass beads or similar small articles on a road marking stripe.

Therefore it is an object of this invention to provide a device which will have improved operation over present dispensers of glass beads in the process of road striping.

It is also an object of this invention to provide apparatus which may be easily adjusted for varying widths of road stripes.

It is a further object of the present invention to provide positive vertically downward glass bead movement in highway road striping.

With the apparatus of the present invention it is possible to provide external flow rate adjustment and a flow rate which is essentially linear over the range of adjustment.

Furthermore, it is possible with the present invention to provide better glass embedment in the road stripe.

Also, glass beads dropped by the dispenser in the present invention are less influenced by external air currents and therefore greater accuracy of marking is obtained.

Other objects and advantages will be apparent from a detailed description of the invention and from the appended drawings and claims.

Figure 2:
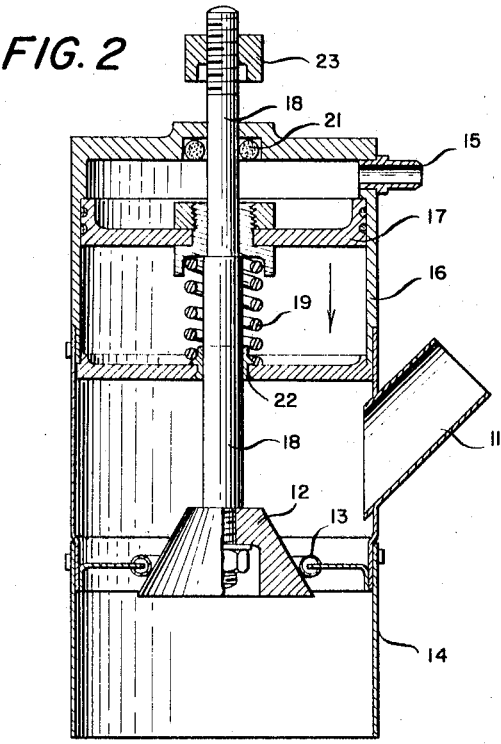
FIG. 2 is a cross-sectioned view of the dispenser of FIG. 1.
Figure 1:
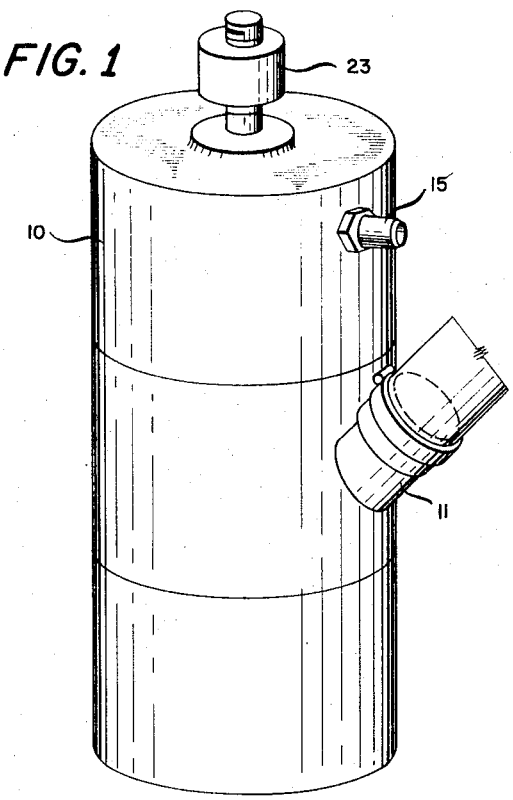
FIG. 1 is a perspective view of one embodiment of the dispenser of the present invention.

FIGS. 1 and 2 show an embodiment of the glass bead dispenser of the present invention. The dispenser consists of a housing 10 into which glass beads are fed through inlet 11. The glass beads are prevented from falling through the lowest surface of the housing 10 by a valve mechanism consisting of a frusto-conical shaped valve member 12 and a valve member seal 13 surrounding the valve member 12.

When the valve member 12 is moved downward an annular opening is provided between the member 12 and the seal 13 through which the glass beads may pass. As the glass beads pass through this annular opening they impinge on member 12 and flow downward and outward on its surface. They then tend to leave the surface and describe a parabolic path outward and downward until they strike the inner face of shroud 14. Shroud 14 restricts the glass beads within a circular area approximately equal in diameter to the inner diameter of the shroud. Thus shrouds of varying diameter may be used to provide distribution of glass beads on lines of various widths. The shroud shown may be easily replaced by a shroud of a different size.

Valve member 12 is moved downward by the use of air pressure introduced through air inlet 15 into an operating cylinder 16 forming the upper part of housing 10. The air pressure pushes piston 17 downward thereby moving stem 18 attached to the piston in the same direction and also moving valve member 12 attached at the bottom of stem 18 in a downward direction. This assembly moves downward against the action of return spring 19. When air pressure is removed such as by opening air inlet 15 to the atmosphere, the return spring 19 pushes the entire assembly including stem 18 and valve member 12 upward until member 12 strikes the seal 13 thereby stopping the motion and sealing the housing 10 outlet. A seal 21 on the stem prevents air from leaking out of the cylinder 16 through the top of housing 10. Friction and wear between the stem 18 and its support in housing 10 may be reduced by the use of a stem bushing 22.

Since the flow of glass beads through the dispenser is proportional to the amount of downward vertical travel of valve member 12, an adjustment can be made by changing the position of flow control stop nut 23 on stem 18. This nut 23 limits the downward travel of the entire moving assembly of stem 18, piston 17 and valve member 12 by striking on the top of the housing 10 when the moving assembly reaches its lower set limit.

Figure 3:
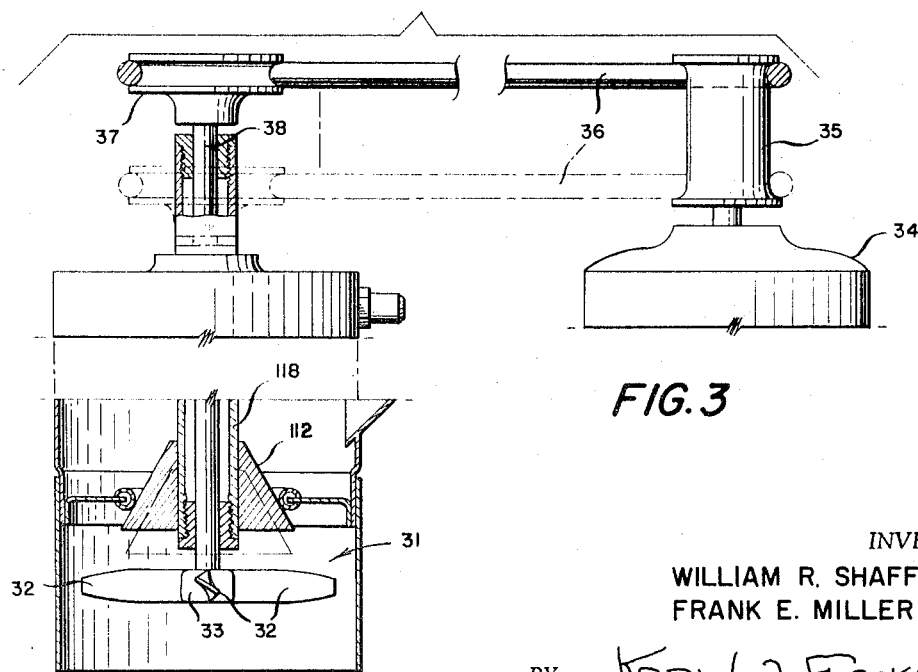
FIG. 3 is another embodiment in partial cross section of the dispenser of the present invention.

To further improve the glass bead pattern and its penetration of the paint film, an axial flow fan 31 may be added as shown in FIG. 3. This fan is added below valve member 112 of that figure. As the glass beads flow downward over the lower edge of valve member 112 they fall into rotating fan 31 consisting of several formed blades 32 about a center hub 33. Blades 32 are so shaped that as they strike the glass spheres these spheres are given an additional downward velocity, and perhaps incidentally, additional radial velocity. Fan 31 also creates a downward moving column of air. This downward glass bead velocity and moving air column has several advantages in that it reduces the effect of lateral air currents caused by the motion of the vehicle upon which the dispenser is mounted, or passing cars. In addition, it reduces the fall time of the glass beads for better synchronization with a spray gun pattern. Also, it causes the glass beads to impinge with greater force on the paint film resulting in better bead embedment and less loss of these beads.

One method of driving this fan is shown in FIG. 3 where a motor 34 turns a drive motor pulley 35 attached thereto, thereby driving a belt 36 which in turn drives a follower pulley 37 attached on fan shaft 38. Fan shaft 38 extends through the center of stem 118 and rotates the fan 31 by the attachment of center hub 33 on fan shaft 38. Stem 118 and valve member 112 act in the same manner as previously described in connection with the embodiment shown in FIG. 2 with the belt 36 moving up or down with follower pulley 37 by changing its vertical position on the surface of drive motor pulley 35 as illustrated in solid and dashed lines showing extreme vertical positions of belt 36 and pulley 37.

Figure 4:
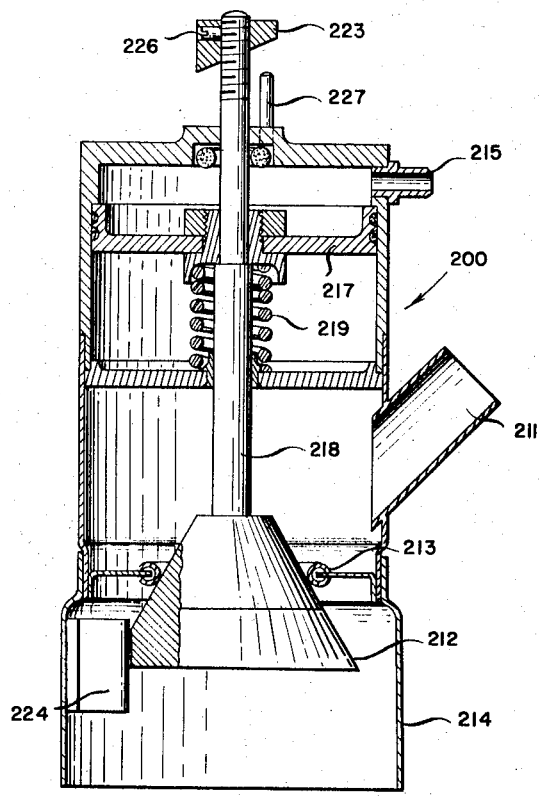
FIG. 4 is a third embodiment of the dispenser of the present invention.
Figure 5:
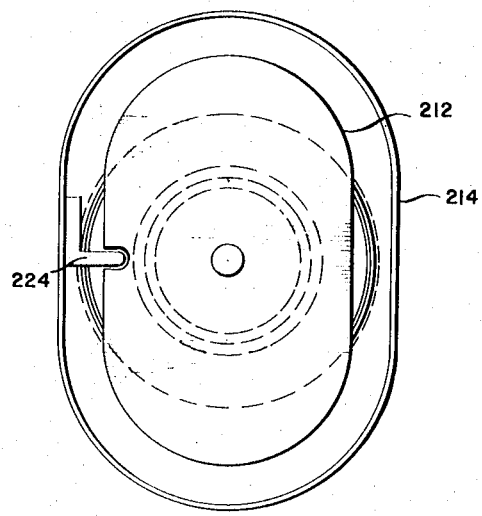
FIG. 5 is a bottom view of the dispenser shown in FIG. 4.

FIGS. 4 and 5 show a modified form of the dispenser discussed above. This modification differs from the embodiment shown in FIGS. 1 and 2 mainly by the different shapes of the valve member and the shroud. In FIG. 5, the lower portion of valve member 212 is shown in the form of a frusto-conical ellipsoid and the shroud 214 is shown substantially elliptical in shape to conform to member 212 but the valve member may take other forms of a geometric solid figure with differing longitudinal and transverse dimensions while the shroud is of complementary shape. The upper portion of valve member 212, where its surface seats against seal 213, is round in horizontal section. Therefore the seal 213 is round as in previous embodiments. With the upper part of dispenser 200 mounted in position on the road striper vehicle, the shroud 214 and valve member 212 may be rotated. Rotation of shroud 214 may be accomplished by hand or other convenient means not shown, but upon the rotation of the shroud, a guide bar 224, attached to the inner surface of shroud 214 and fitting into a notch in the side of valve member 212 will turn the valve member 212 in conjunction with the shroud 214. This bar 224 also guides the valve member 212 in its vertical travels. To limit the amount of travel in the vertical direction of stem 218, piston 217 and valve member 212 a flow control stop nut 223 is again attached on the top of stem 218 as previously discussed. In this particular embodiment the flow control stop nut 223 is held in its adjusted position by a set screw 226 and instead of this stop nut 223 contacting the top of the dispenser housing it is stopped when contact is made between the stop nut 223 and a stop pin 227 extending upward from the housing. Because of the sloping undersurface of stop nut 223 and since the stop nut 223 is attached to rotate with stem 218 and valve member 212, an automatic adjustment is made of the opening between valve member 212 and seal 213, thereby compensating for the different amounts of flow required for different line widths. As in the previous cases, beads are fed through inlet 211 and operation of the valve member 212 takes place through air pressure of air pumped into air inlet 215 acting against piston 217 and upon release of this compressed air to the atmosphere, the upward movement of piston 217 due to the action of return spring 219 takes place.

Figure 6A:
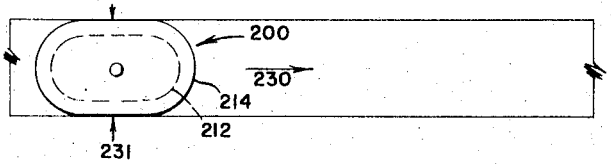
FIGS. 6A, 6B and 6C show a method of varying the width of a line of glass beads to conform to varying widths of paint lines on a highway surface using an embodiment of the dispenser shown in FIGS. 4 and 5.
Figure 6B:
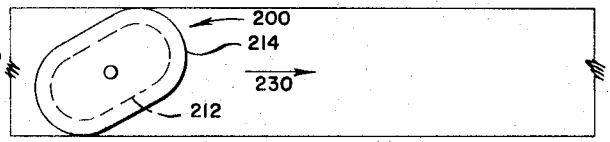
Figure 6C:
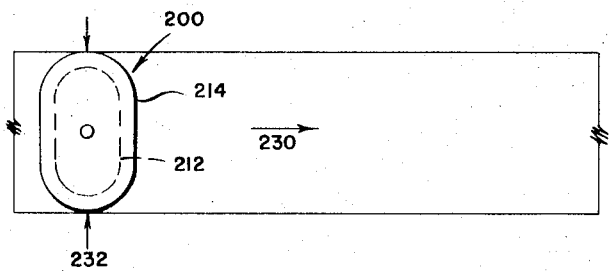

The elliptical shapes of shroud 214 and valve member 212 allow a simple method of varying the width of the line area over which beads are being dropped to conform to the width of the paint line being applied to the roadway. This method is illustrated in FIGS. 6A, 6B and 6C. Arrows 230 designate the direction of travel of the dispenser 200 along the roadway. The narrowest line width available is equal to the minor diameter 213 of shroud 214. This is illustrated in the diagrammatic plan view of FIG. 6A. By rotation of the shroud 214 and valve member 212 with respect to the line, the line width may be increased as shown in FIG. 6B, until shroud 214 and member 212 have been rotated 90° from their original position as shown in FIG. 6C. At that time the maximum line width which is equal to the major diameter 232 of the elliptically shaped shroud 214 is obtainable. Therefore, as illustrated in these figures, the line width may be varied from a minimum width equal to a minor diameter 231 to the maximum line width obtainable equal to the major diameter 232. Merely by rotation of the shroud 214 and member 212 with respect to the line being made on the roadway, the line width over which beads may be dropped may be varied.

Figure 7:
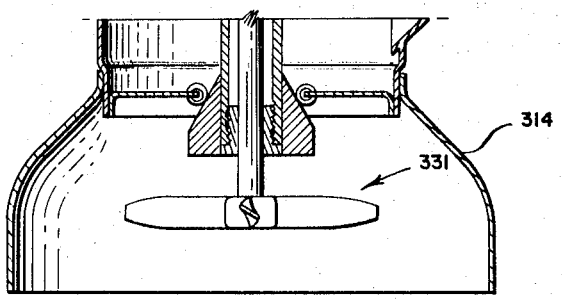
FIG. 7 is a partial section view of the lower portion of another embodiment of the dispenser of the present invention.
Figure 8:
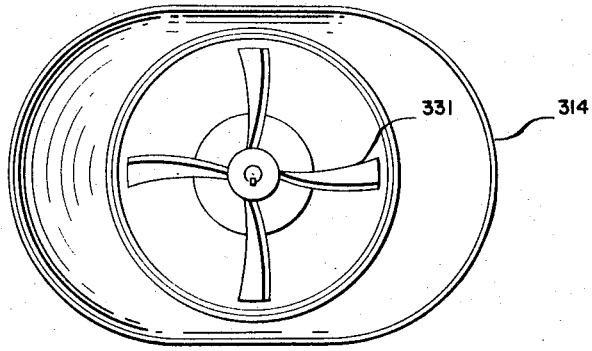
FIG. 8 is a bottom view of the embodiment of the dispenser shown in FIG. 7.

FIGS. 7 and 8 show another embodiment of the present invention wherein the elliptically shaped shroud 314 as previously discussed in connection with the embodiment of FIGS. 4 and 5 is combined with an axial flow 331 discussed in connection with the embodiment illustrated in FIG. 3. Therefore, the embodiment in these figures will combine the advantage of easily adjustable line thickness with the advantages previously discussed, such as those which result from the additional downward velocity of the beads and the moving air column created by the axial fan.

The embodiments of dispensers discussed above would, of course, be required to be so located on road striping equipment so as to follow each paint spray nozzle.

It will be obvious to those skilled in the art that various changes may be made without departing from the scope of the invention and therefore the invention is not limited to what is shown in the drawings and described in the specification but only as indicated in the appended claims.

What is claimed is:
1. A dispenser for distributing granular materials over a linear area adapted for mounting in conjunction with road marking equipment comprising
 a housing for the dispenser,
 a vertically reciprocable stem mounted in said housing and extending through the top thereof,
 a piston mounted on said stem for movement therewith,
 a passageway for air into said housing in a location to move said piston,
 spring means mounted to oppose movement of said piston by air flow into said housing,
 stop means to limit the vertical movement of said stem in at least one direction,
 a frusto-conical valve member mounted on the lower end of said stem,
 an inlet means into said housing located above said valve member for the granular materials,
 a shroud member attached to the lower edge of said housing and extending below said valve member,
 a resilient seal encircling said valve member and contacting the surface of said valve member in its highest position of reciprocal movement,
 said frusto-conical valve member including at least a lower portion in the shape of a geometric solid figure with differing longitudinal and transverse dimensions,
 said shroud member having a shape with its bottom edge substantially in the shape of a geometric plane figure of complementary shape,
 and means to rotate said shroud member and said valve member in unison, attached to at least one of said members.

2. The dispenser of claim 1, further characterized by means to rotate at least said shroud member whereby the width of the linear area covered by granular material may be varied.

3. The dispenser of claim 1, further characterized by an axial flow fan mounted below said valve member so as to rotate in a horizontal plane whereby a downward flow of air takes place along with an additional downward velocity imparted to the granular material. ward velocity imparted to the granular material.

4. The dispenser of claim 3, further characterized by means to rotate at least said shroud member whereby the width of the linear area covered by granular material may be varied.

5. A dispenser for distributing granular materials over a linear area adapted for mounting in conjunction with road marking equipment comprising
 a housing for the dispenser,
 a vertically reciprocable stem mounted in said housing and extending through the top thereof,
 a piston mounted on said stem for movement therewith,
 a passageway for air into said housing in a location to move said piston,
 spring means mounted to oppose movement of said piston by air flow into said housing,
 stop means to limit the vertical movement of said stem in at least one direction,
 a frusto-conical valve member mounted on the lower end of said stem,
 an inlet means into said housing located above said valve member for the granular materials,
 a shroud member attached to the lower edge of said housing and extending below said valve member,
 and a resilient seal encircling said valve member and contacting the surface of said valve member in its highest position of reciprocal movement,
 said frusto-conical valve member including at least a lower portion in the shape of an ellipsoid,
 said shroud member having a shape with its bottom edge substantially in the shape of an ellipse,
 guide means acting with said valve member to guide the reciprocal motion of said valve member and said stem, said guide means attached to said shroud so as to cause rotative movement of said valve member and said shroud in unison.

6. A dispenser for distributing granular materials over a linear area adapted for mounting in conjunction with road marking equipment comprising a housing for the dispenser,
a vertically reciprocable stem mounted in said housing and extending through the top thereof,
a piston mounted on said stem for movement therewith,
a passageway for air into said housing in a location to move said piston,
spring means mounted to oppose movement of said piston by air flow into said housing,
stop means to limit the vertical movement of said stem in at least one direction,
a frusto-conical valve member mounted on the lower end of said stem,
an inlet means into said housing located above said valve member for the granular materials,
a shroud member attached to the lower edge of said housing and extending below said valve member,
a resilient seal encircling said valve member and contacting the surface of said valve member in its highest position of reciprocal movement,
guide means acting with said valve member to guide the reciprocal motion of said valve member and said stem,
said guide means attached to said shroud so as to cause rotative movement of said valve member and said shroud in unison.

7. A method of distributing granular material over a linear area of varying widths which comprises feeding said granular material into a dispensing means having an elliptical shaped lower shroud member, and a valve member extending therein so as to have its lower peripheral portion surrounded by said shroud member,
rotating said valve member and said shroud member in unison until the outermost points of separation of the inner surface of said shroud member are coincident with the outer edges of the linear area to be covered and maintaining said valve and shroud members in that relative position of rotation,
releasing the flow of said granular material by said valve means into said shroud member,
and moving said dispensing means in the direction of extension of the linear area to be covered.

References Cited

UNITED STATES PATENTS

| | | | |
|---|---|---|---|
| 1,459,915 | 6/1923 | Koehmstedt | 275—15 |
| 2,673,090 | 3/1954 | Blumberg | 275—8 |
| 2,833,542 | 5/1958 | Martin | 275—2 |
| 2,895,647 | 7/1959 | Wald et al. | 222—504 X |

ABRAHAM G. STONE, *Primary Examiner.*

J. R. OAKS, *Assistant Examiner.*